(12) United States Patent
Huang et al.

(10) Patent No.: US 8,554,260 B2
(45) Date of Patent: Oct. 8, 2013

(54) POWER CONSUMPTION CONTROL METHOD OF A COMMUNICATION SYSTEM AND RELATED COMMUNICATION SYSTEM

(75) Inventors: Liang-Wei Huang, Taipei (TW); Ta-Chin Tseng, Taipei County (TW); Ting-Fa Yu, Yunlin County (TW); Li-Wei Fang, Taichung County (TW)

(73) Assignee: Realtek Semiconductor Corp., Hsinchu (TW)

( * ) Notice: Subject to any disclaimer, the term of this patent is extended or adjusted under 35 U.S.C. 154(b) by 649 days.

(21) Appl. No.: 12/727,210

(22) Filed: Mar. 18, 2010

(65) Prior Publication Data

US 2010/0248774 A1    Sep. 30, 2010

(30) Foreign Application Priority Data

Mar. 24, 2009  (TW) .............................. 98109612 A

(51) Int. Cl.
*H04B 7/185* (2006.01)
*H04B 7/00* (2006.01)

(52) U.S. Cl.
USPC ......................................... 455/522; 370/318

(58) Field of Classification Search
USPC ......................................... 455/522; 370/318
See application file for complete search history.

(56) References Cited

U.S. PATENT DOCUMENTS

| | | | | |
|---|---|---|---|---|
| 5,771,237 A * | 6/1998 | Kao | ............................... | 370/463 |
| 7,288,951 B1 * | 10/2007 | Bailey et al. | ............. | 324/750.05 |
| 7,348,796 B2 * | 3/2008 | Crouch et al. | ................... | 326/38 |
| 7,477,611 B2 * | 1/2009 | Huff | ............................... | 370/252 |
| 7,486,323 B2 * | 2/2009 | Lee et al. | ................... | 348/333.12 |
| 7,826,383 B2 * | 11/2010 | Savard et al. | ................... | 370/249 |
| 8,295,194 B2 * | 10/2012 | Huang et al. | ................... | 370/252 |
| 8,494,032 B2 * | 7/2013 | Huang et al. | ................... | 375/219 |
| 2007/0109967 A1 * | 5/2007 | Ha | ............................... | 370/232 |
| 2007/0111687 A1 * | 5/2007 | Weng et al. | ................ | 455/127.5 |
| 2007/0167184 A1 | 7/2007 | Lee | | |
| 2007/0211643 A1 * | 9/2007 | Hsieh et al. | ..................... | 370/250 |
| 2009/0017850 A1 * | 1/2009 | Jovicic et al. | .................. | 455/501 |
| 2013/0151458 A1 * | 6/2013 | Indeck et al. | ..................... | 706/47 |

FOREIGN PATENT DOCUMENTS

| | | |
|---|---|---|
| CN | 101151814 A | 3/2008 |
| JP | 2006262212 | 9/2006 |
| TW | I260894 | 8/2006 |
| TW | 200737781 | 10/2007 |

\* cited by examiner

*Primary Examiner* — Bobbak Safaipour
(74) *Attorney, Agent, or Firm* — McClure, Qualey & Rodack, LLP

(57) ABSTRACT

A communication system includes a first network device and a second network device. A power consumption control method applied to the communication system includes the steps of: checking a receiving capability of the first network device to generate a first checking result; and selectively notifying the second network device to adjust a transmitting capability of the second network device according to the first checking result. When the first checking result indicates that the receiving capability of the first network device is greater than a first threshold, transmit a first notice signal to notify the second network device. When receiving the first notice signal, lower the transmitting capability of the second network device.

18 Claims, 7 Drawing Sheets

POWER CONSUMPTION CONTROL METHOD OF A COMMUNICATION SYSTEM AND RELATED COMMUNICATION SYSTEM

BACKGROUND OF THE INVENTION

1. Field of the Invention

The present invention relates to a power consumption control method applied to a communication system and related devices, and more particularly, to a method and a device making use of communications between two network devices to adjust transmitting capabilities of these two network devices in order to save power and making use of a fallback mechanism to avoid errors.

2. Description of the Prior Art

In a high speed communication system, such as a 1Gbase-T/10Gbase-T Ethernet system, the power consumption of the communication system increases correspondingly as its circuits operate frequently. Furthermore, the power consumption of the communication system increases correspondingly as the number of its transport ports increases. Hence, how to save the power consumption of the communication system becomes an important topic in this field.

Presently, the most common power-saving method is to adjust its own parameters of a network device (e.g. a first network device) in the communication system. For example, the transmitting capability of its transmitter or the receiving capability of its receiver can be lowered so as to save power. Since it is unable to make sure whether the other side (e.g. a second network device) can still link normally after lowering the transmitting capability or the receiving capability of the first network device, a margin is usually reserved in order to avoid errors. However, the reserved margin will result in waste of power consumption, which cannot achieve the optimum power-saving performance.

SUMMARY OF THE INVENTION

It is therefore one of the objectives of the claimed invention to provide a power consumption control method applied to a communication system and a related device to solve the abovementioned problems.

According to an exemplary embodiment of the present invention, a power consumption control method applied to a communication system is provided. The communication system consists of a first network device and a second network device. The power consumption control method includes the step of: checking a receiving capability of the first network device to generate a first checking result; and selectively notifying the second network device to adjust a transmitting capability of the second network device according to the first checking result. When the first checking result indicates that the receiving capability of the first network device is greater than a first threshold, transmitting a first notice signal to notify the second network device; and when the first notice signal is received, lowering the transmitting capability of the second network device.

According to another exemplary embodiment of the present invention, a power consumption control method applied to a communication system is provided. The power consumption control method includes the steps of: lowering a voltage level of an idle sequence to a predetermined voltage level; and using the predetermined voltage level to transmit the idle sequence.

According to another exemplary embodiment of the present invention, a communication system capable of controlling power consumption is provided. The communication system consists of a first network device and a second network device. The first network device includes a first receiver, a first transmitter, a first checking module, and a first signal transmitting module. The first checking module checks a receiving capability of the first receiver of the first network device to generate a first checking result. The first signal transmitting module selectively generates a notice signal according to the first checking result. The second network device includes a second receiver, a second transmitter, and a second transmitting capability adjusting module. The second transmitting capability adjusting module adjusts a transmitting capability of the second transmitter of the second network device according to the notice signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
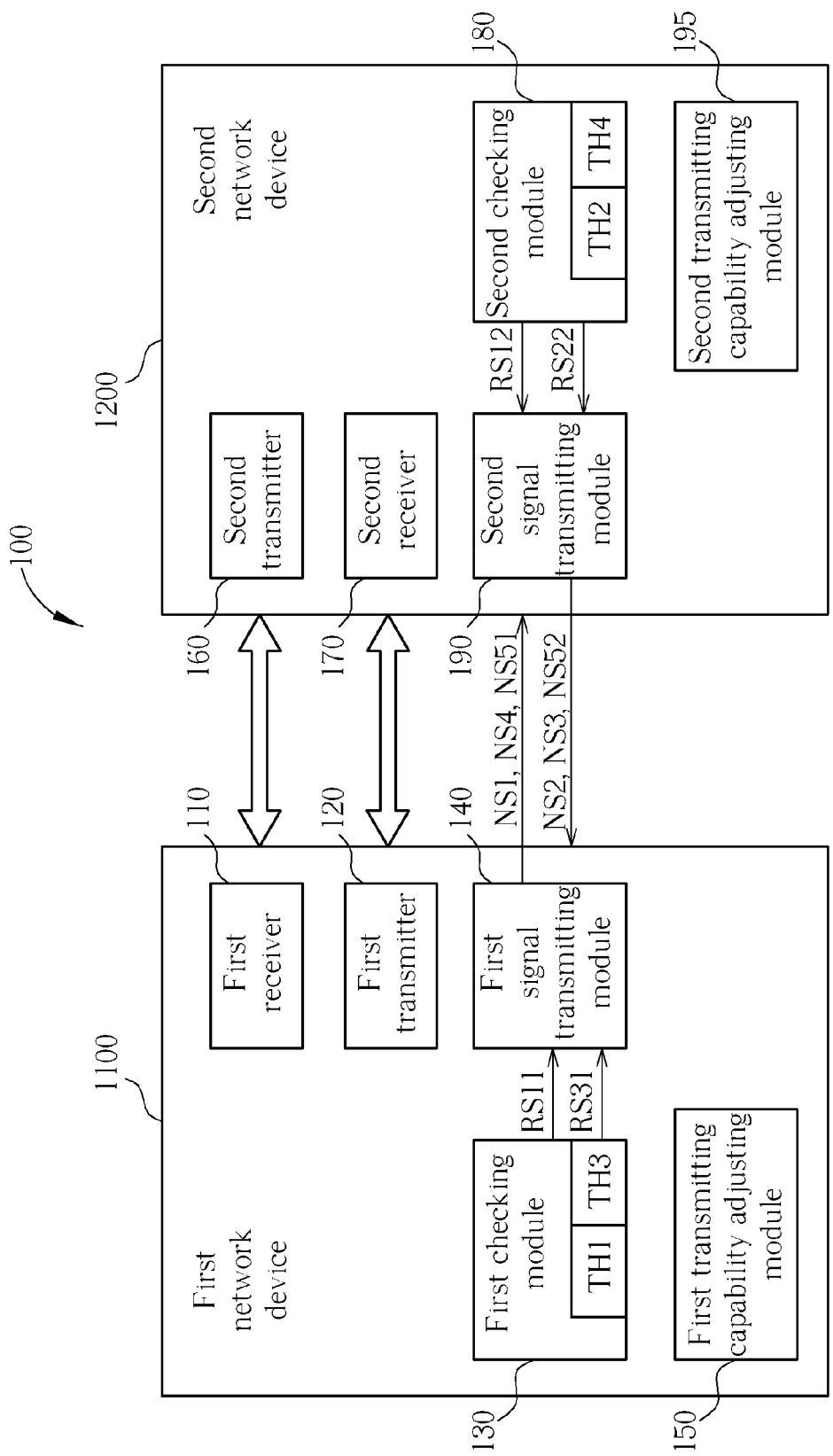
FIG. 1 is a diagram of a communication system capable of controlling power consumption according to a first embodiment of the present invention.

Please refer to FIG. 1. FIG. 1 is a diagram of a communication system 100 capable of controlling power consumption according to a first embodiment of the present invention. As shown in FIG. 1, the communication system 100 consists of a first network device 1100 and a second network device 1200. The first network device 1100 includes, but is not limited to, a first receiver 110, a first transmitter 120, a first checking module 130, a first signal transmitting module 140, and a first transmitting capability adjusting module 150. The second network device 1200 includes, but is not limited to, a second transmitter 160, a second receiver 170, a second checking module 180, a second signal transmitting module 190, and a second transmitting capability adjusting module 195. The first checking module 130 checks a receiving capability of the first receiver 110 of the first network device 1100 to generate a first checking result RS11. The first signal transmitting module 140 selectively generates a notice signal according to the first checking result RS11. The second transmitting capability adjusting module 195 adjusts a transmitting capability of the second transmitter 160 of the second network device 1200 according to the notice signal. On the other hand, the second checking module 180 checks a receiving capability of the second receiver 170 of the second network device 1200 to generate a second checking result RS12. The second signal transmitting module 190 selectively generates another notice signal according to the second checking result RS12. The first transmitting capability adjusting module 150 adjusts a transmitting capability of the first transmitter 120 of the first network device 1100 according to the notice signal.

In the following descriptions, several examples are cited for illustrating how to selectively notify the second network device 1200 to adjust the transmitting capability of the second transmitter 160 according to the first checking result RS11.

In a first case, the communication system 100 is a 10M/100Mbase-T system, and the first checking result RS11 indicates that the receiving capability of the first receiver 110 of the first network device 1100 is greater than a first threshold TH1. At this time, the first signal transmitting module 140 of the first network device 1100 transmits a first notice signal NS1 to notify the second network device 1200. When the first notice signal NS1 is received by the second network device 1200, the second transmitting capability adjusting module 195 directly lowers the transmitting capability of the second transmitter 160.

In a second case, the communication system 100 is a 1Gbase-T system or a 10Gbase-T system, and the first checking result RS11 indicates that the receiving capability of the first receiver 110 of the first network device 1100 is greater than the first threshold TH1. At this time, the first signal transmitting module 140 of the first network device 1100 transmits the first notice signal NS1 to notify the second network device 1200. When the first notice signal NS1 is received by the second network device 1200, the second transmitting capability adjusting module 195 lowers the transmitting capability of the second transmitter 160. If the transmitting capability of the second transmitter 160 is lowered, it may cause the second receiver 170 to have a poor receiving capability. Hence, after the second transmitting capability adjusting module 195 lowers the transmitting capability of the second transmitter 160, the second checking module 180 checks the receiving capability of the second receiver 170 to generate a second checking result RS22. In the following, descriptions are divided into two conditions for illustrations. When the second checking result RS22 indicates that the receiving capability of the second receiver 170 is greater than a second threshold TH2, the second signal transmitting module 190 transmits a second notice signal NS2 to notify the first network device 1100 to be able to continue to lower the transmitting capability of the second transmitter 160. On the contrary, when the second checking result RS22 indicates that the receiving capability of the second receiver 170 is not greater than the second threshold TH2, the second signal transmitting module 190 transmits a third notice signal NS3 to notify the first network device 1100 not allowed to continue to lower the transmitting capability of the second transmitter 160.

In a third case, after the second transmitting capability adjusting module 195 lowers the transmitting capability of the second transmitter 160, the first checking module 130 of the first network device 1100 detects that the receiving capability of the first receiver 110 becomes too poor. At this time, the first checking module 130 checks the receiving capability of the first receiver 110 to generate a third checking result RS31. When the third checking result RS31 indicates that the receiving capability of the first receiver 110 is not greater than the first threshold TH1, the first signal transmitting module 140 transmits a fourth notice signal NS4 to notify the second network device 1200. When the fourth notice signal NS4 is received, the second transmitting capability adjusting module 195 raises the transmitting capability of the second transmitter 160. In other words, if the poor receiving capability of the first receiver 110 is caused from lowering the transmitting capability of the second transmitter 160 by the second transmitting capability adjusting module 195, it is necessary to ask the second transmitting capability adjusting module 195 to immediately raise the transmitting capability of the second transmitter 160.

In the abovementioned cases, the first checking module 130 and the second checking module 180 are able to check the a signal to noise ratio (SNR), a maximum error, or a Viterbi error of a network signal received by the first receiver 110 and the second receiver 170 as a reference for checking the receiving capability of them. The first transmitting capability adjusting module 150 and the second transmitting capability adjusting module 195 are able to respectively adjust working voltages of the first transmitter 120 and the second transmitter 160 or respectively adjust amplitudes of signals transmitted by the first transmitter 120 and the second transmitter 160 so as to adjust their transmitting capabilities. Furthermore, the abovementioned embodiments can be executed under a training mode of the communication system 100, e.g. a procedure for building a network connection, but the invention is not limited to this only.

On the other hand, the second checking module 180 of the second network device 1200 is able to check the receiving capability of the second receiver 170 of the second network device 1200 to generate a first checking result RS12, and the second signal transmitting module 190 is able to selectively notify the first network device 1100 to adjust the transmitting capability of the first transmitter 120 according to the first checking result RS12. Since the details and operations of how the second network device 1200 asks the first network device 1100 to adjust the transmitting capability of the first transmitter 120 are the same as the operations of how the first network device 1100 asks the second network device 1200 to adjust the transmitting capability of the second transmitter 160 mentioned above, further detailed description is omitted herein for brevity.

As can be seen form descriptions above, the communication system 100 is capable of adjusting the transmitting capabilities of the network devices by making use of communications between these two network devices 1100 and 1200, which can achieve a goal of saving power. Moreover, after lowering or raising the transmitting capabilities of the both sides for several times, optimum setting parameters can be found to achieve an optimum power-saving performance.

Certainly, the aforementioned communication system 100 is merely a practicable embodiment of the present invention. In other embodiments, more features can be designed into the first network device 1100 and the second network device 1200 in order to improve the applications of the communication system 100.

Figure 2:
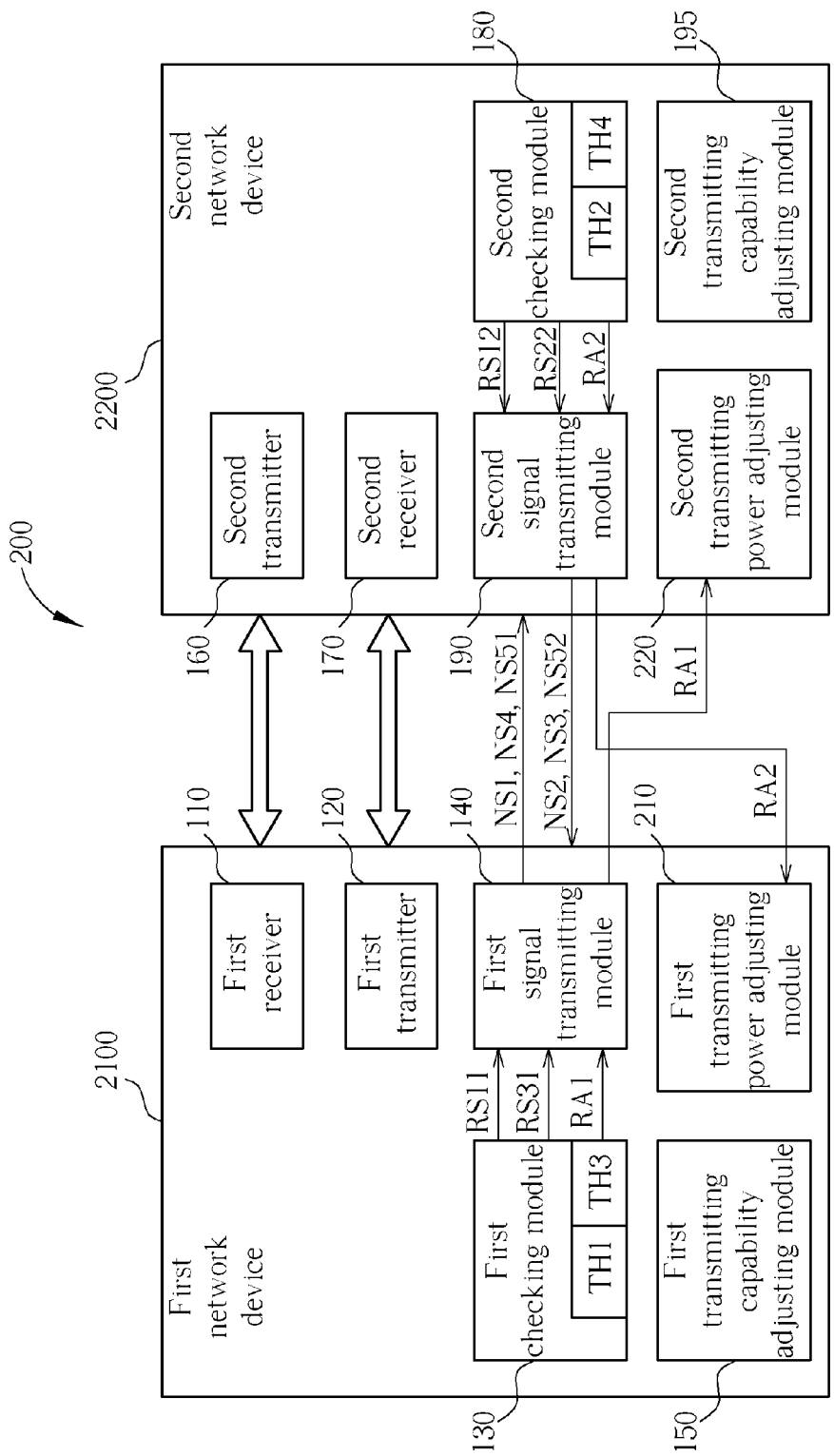
FIG. 2 is a diagram of a communication system capable of controlling power consumption according to a second embodiment of the present invention.

Please refer to FIG. 2. FIG. 2 is a diagram of a communication system 200 capable of controlling power consumption according to a second embodiment of the present invention. The architecture of the communication system 200 shown in FIG. 2 is similar to that of the communication system 100 shown in FIG. 1, and the difference between them is that a first network device 2100 and a second network device 2200 of the communication system 200 respectively include a first transmitting power adjusting module 210 and a second transmitting power adjusting module 220. At this time, the first checking module 130 of the first network device 2100 further checks a first adjustable range RA1 of the receiving capability of the first receiver 110, and the first signal transmitting module 140 further transmits the first adjustable range RA1 to the second network device 2200. When the first adjustable range RA1 transmitted from the first network device 2100 is received by the second network device 2200, the second transmitting power adjusting module 220 lowers the transmitting power of the second transmitter 160 of the second network device 2200 according to the first adjustable range RA1. On the other hand, the second checking module 180 of the second network device 2200 further checks a second adjustable range RA2 of the receiving capability of the second receiver 170, and the second signal transmitting module 190 further transmits the second adjustable range RA2 to the first network device 2100. When the second adjustable range RA2 transmitted from the second network device 2200 is received by the first network device 2100, the first transmitting power adjusting module 210 lowers the transmitting power of the first transmitter 120 of the first network device 2100 according to the second adjustable range RA2.

In short, in the first embodiment above, the communication system 100 is able to adjust the transmitting capabilities of the network devices by making use of communications between these two network devices 1100 and 1200, which can achieve a goal of saving power. In the second embodiment above, the communication system 200 is able to adjust the transmitting power of the network devices by making use of communications between these two network devices 2100 and 2200, which can save more power. Be noted that the communication system 100 is suitable for a 10M/100Mbase-T system, a 1Gbase-T system, or a 10Gbase-T system, while the communication system 200 is merely suitable for a 10M/100Mbase-T system or a 1Gbase-T system.

Figure 3:
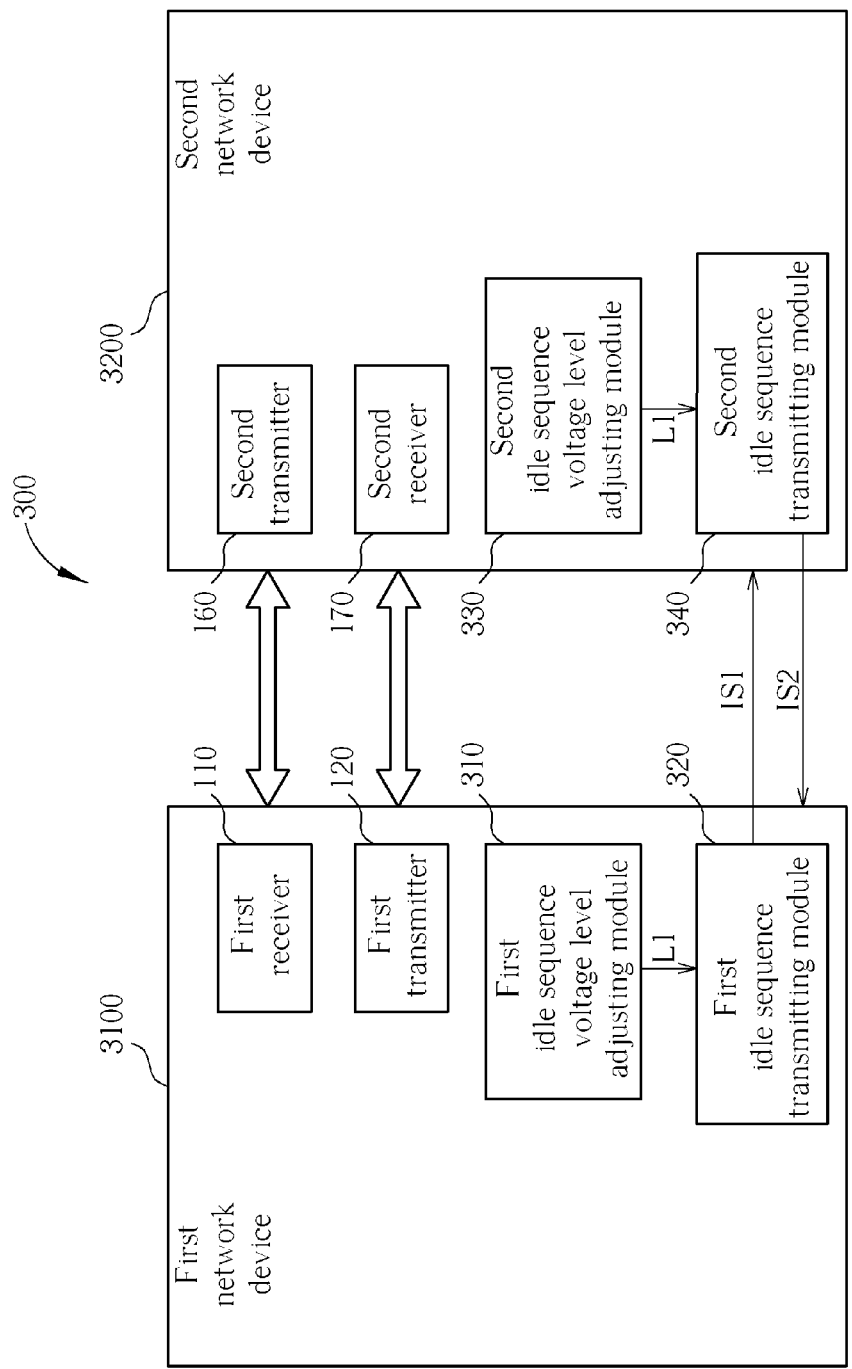
FIG. 3 is a diagram of a communication system capable of controlling power consumption according to a third embodiment of the present invention.

Please refer to FIG. 3. FIG. 3 is a diagram of a communication system 300 capable of controlling power consumption according to a third embodiment of the present invention. As shown in FIG. 3, the communication system 300 consists of a first network device 3100 and a second network device 3200. The first network device 3100 includes a first receiver 110, a first transmitter 120, a first idle sequence voltage level adjusting module 310, and a first idle sequence transmitting module 320. The first idle sequence voltage level adjusting module 310 lowers a voltage level of an idle sequence IS1 to a predetermined voltage level L1, and the first idle sequence transmitting module 320 uses the predetermined voltage level L1 to transmit the idle sequence IS1. On the other hand, the second network device 3200 includes a second receiver 170, a second transmitter 160, a second idle sequence voltage level adjusting module 330, and a second idle sequence transmitting module 340. The second idle sequence voltage level adjusting module 330 lowers a voltage level of an idle sequence IS2 to the predetermined voltage level L1, and the second idle sequence transmitting module 340 uses the predetermined voltage level L1 to transmit the idle sequence IS2. For example, assume that a PAM5 modulation is used for transmitting data in a 1Gbase-T system. In the prior art, the voltage levels of +2, +1, 0, −1, and −2 are adopted for transmitting data under a normal mode, and the voltage levels of +2, 0, and −2 are adopted for transmitting data under an idle mode. In this embodiment, the predetermined voltage levels of +1, 0, and −1 are adopted for transmitting the idle sequences IS1 and IS2, which can save power under the idle mode.

Please note that the abovementioned embodiments can be executed under a training mode of the communication system, e.g. the procedure for building a network connection, but this should not be considered as limitations of the present invention. If there are errors caused from environmental deteriorations occur in the network device after building the network connection under a data mode, a fallback mechanism is required to notify the other side to restore the abovementioned over-adjusted parameters. Please also refer to FIG. 1 or FIG. 2. When the first checking result RS11 indicates that the receiving capability of the first receiver 110 is not greater than a third threshold TH3 being different from the first threshold TH1, the first signal transmitting module 140 transmits a notice signal NS51 to notify the second network device 1200. When the notice signal NS51 is received by the second network device 1200, the second transmitting capability adjusting module 195 raises the transmitting capability of the second transmitter 160. Similarly, when the first checking result RS12 indicates that the receiving capability of the second receiver 170 is not greater than a fourth threshold TH4 being different from the second threshold TH2, the second signal transmitting module 180 transmits a notice signal NS52 to notify the first network device 1100. When the notice signal NS52 is received by the first network device 1100, the first transmitting capability adjusting module 150 raises the transmitting capability of the first transmitter 120. This embodiment is executed under a data mode, but the present invention is not limited to this only.

The abovementioned embodiments are presented merely to illustrate practicable designs of the present invention, and in no way should be considered to be limitations of the scope of the present invention. Those skilled in the art should appreciate that various modifications of the communication systems shown in FIG. 1-FIG. 3 may be made without departing from the spirit of the present invention. For example, the communication systems 100-300 shown in FIG. 1-FIG. 3 can be arranged or combined randomly into a new varied embodiment, which also belongs to the scope of the present invention.

Figure 4:
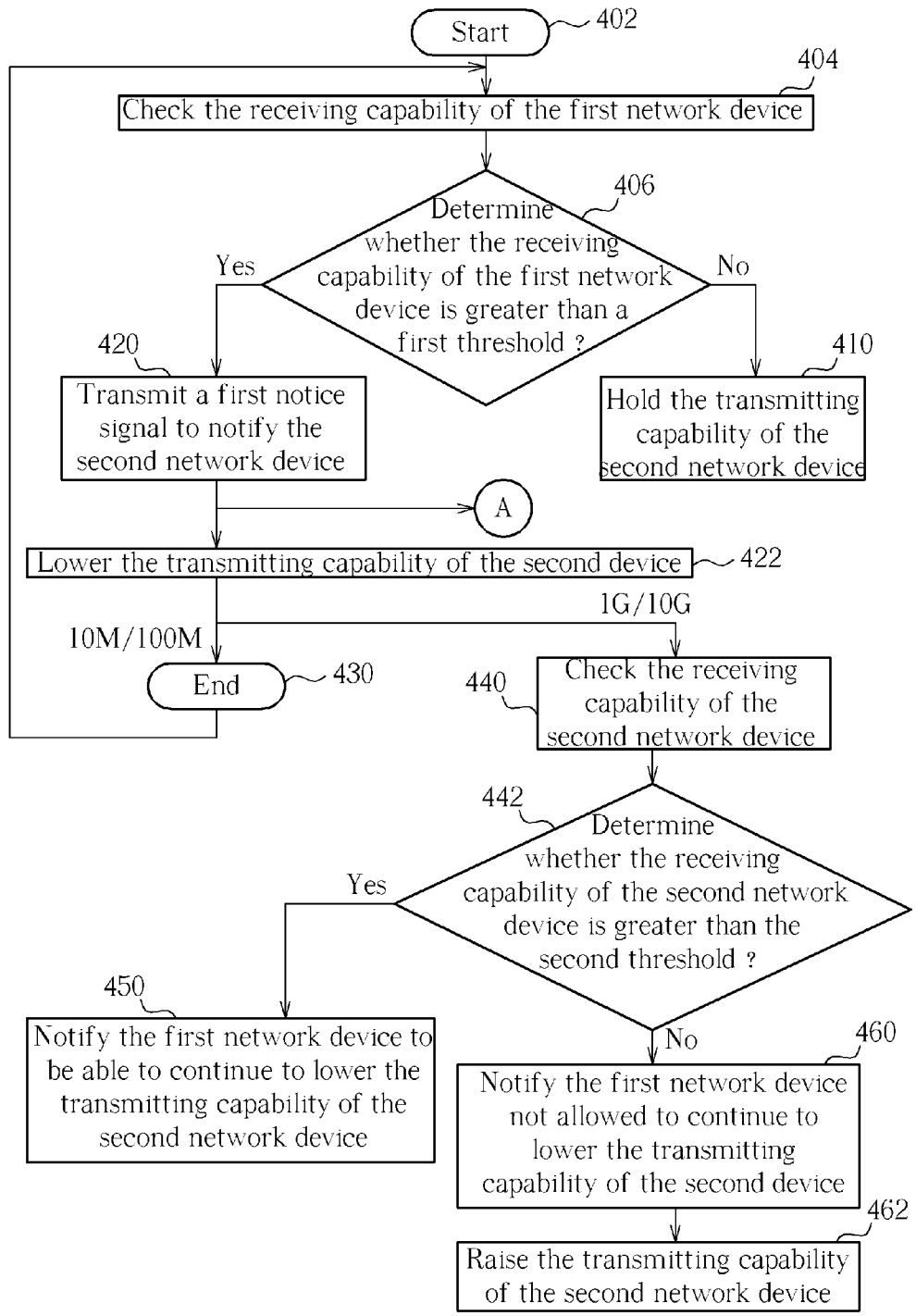
FIG. 4 is a flowchart illustrating a power consumption control method applied to a communication system according to an exemplary embodiment of the present invention.

Please refer to FIG. 4. FIG. 4 is a flowchart illustrating a power consumption control method applied to a communication system according to an exemplary embodiment of the present invention. Please note that the following steps are not limited to be performed according to the exact sequence shown in FIG. 4 if a roughly or substantially identical result can be obtained. The method includes, but is not limited to, the following steps:

Step 402: Start.

Step 404: Check the receiving capability of the first network device to generate a first checking result. After that, go to Step 406.

Step 406: Determine whether the receiving capability of the first network device is greater than a first threshold. When the first checking result indicates that the receiving capability of the first network device is greater than the first threshold, go to Step 420; otherwise, go to Step 410.

Step 410: Hold the transmitting capability of the second network device.

Step 420: Transmit a first notice signal to notify the second network device. Jump to the node A.

Step 422: When the first notice signal is received, lower the transmitting capability of the second device. If the communication system is a 10M/100Mbase-T system, go to Step 430; or if the communication system is a 1Gbase-T system or a 10Gbase-T system, go to Step 440.

Step 430: End. Go back to Step 404.

Step 440: Check the receiving capability of the second network device to generate a second checking result. After that, go to Step 442.

Step 442: Determine whether the receiving capability of the second network device is greater than the second threshold. When the second checking result indicates that the receiving capability of the second network device is greater than the second threshold, go to Step 450; otherwise, go to Step 460.

Step 450: Transmit a second notice signal to notify the first network device to be able to continue to lower the transmitting capability of the second network device.

Step 460: Transmit a third notice signal to notify the first network device not allowed to continue to lower the transmitting capability of the second device. After that, go to Step 462.

Step 462: Raise the transmitting capability of the second network device.

How each element operates can be known by collocating the steps shown in FIG. 4 and the elements shown in FIG. 1, and further description is omitted here for brevity. The steps 404 and 406 are executed by the first checking module 130, the steps 410, 422, as well as 462 are executed by the second transmitting capability adjusting module 195, the step 420 is executed by the first signal transmitting module 140, the steps 440 and 442 are executed by the second checking module 180, and the steps 450 and 460 are executed by the second signal transmitting module 190. Please note that the steps 420~430 represent the first case mentioned in the first embodiment above, that is, the communication system 100 is a 10M/100Mbase-T system; while the steps 420~462 represent the second case mentioned in the first embodiment above, that is, the communication system 100 is a 1Gbase-T system or a 10Gbase-T system.

Figure 5:
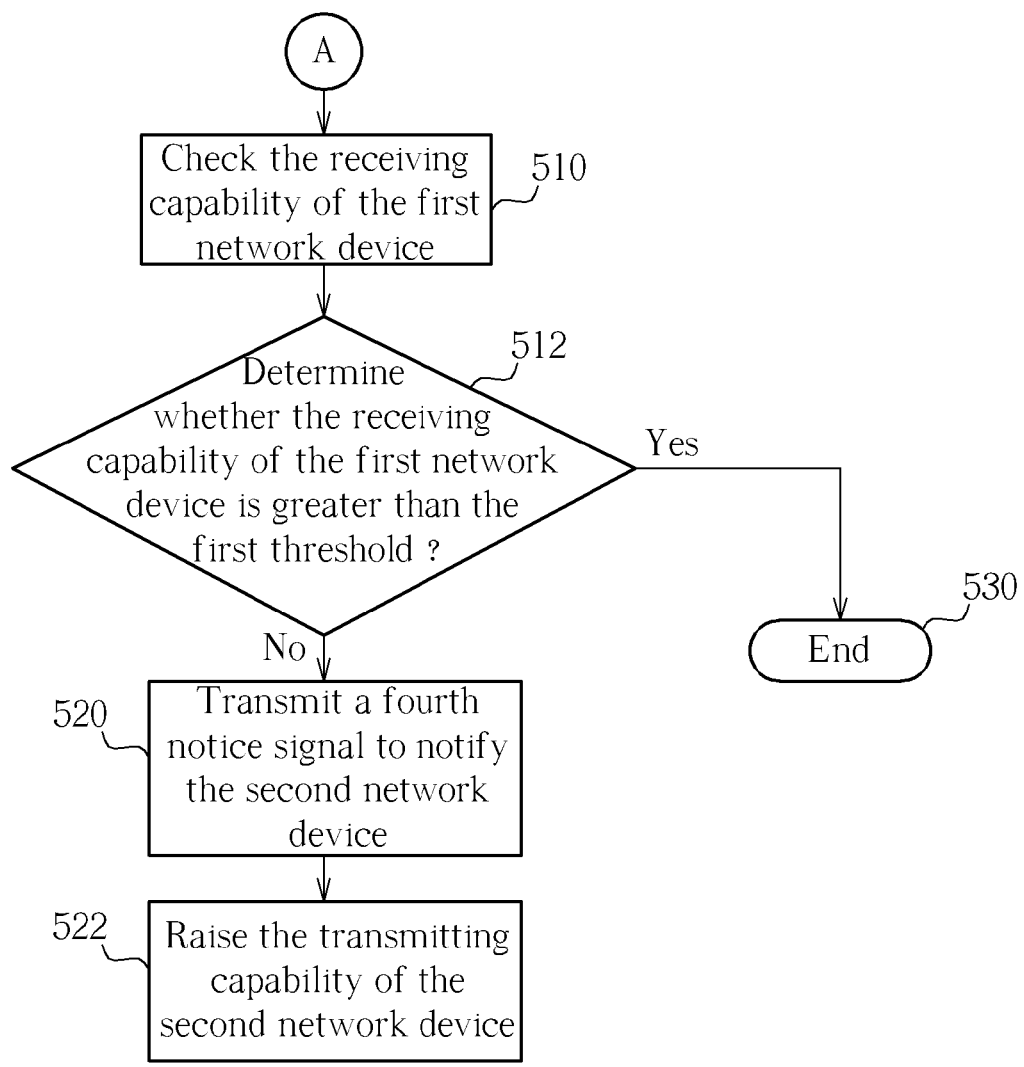
FIG. 5 is a flowchart illustrating a power consumption control method applied to a communication system according to another exemplary embodiment of the present invention.

Please refer to FIG. 5. FIG. 5 is a flowchart illustrating a power consumption control method applied to a communication system according to another exemplary embodiment of the present invention. The method includes, but is not limited to, the following steps:

Step 510: Check the receiving capability of the first network device to generate a third checking result. After that, go to Step 512.

Step 512: Determine whether the receiving capability of the first network device is greater than the first threshold. When the third checking result indicates that the receiving capability of the first network device is not greater than the first threshold, go to Step 530; otherwise, go to Step 520.

Step 520: Transmit a fourth notice signal to notify the second network device. After that, go to Step 522.

Step 522: When the fourth notice signal is received, raise the transmitting capability of the second network device.

Step 530: End.

How each element operates can be known by collocating the steps shown in FIG. 5 and the elements shown in FIG. 1, and further description is omitted here for brevity. The step 510 shown in FIG. 5 is extended from the node A shown in FIG. 4. Please note that the steps 510~522 represent the third case mentioned in the first embodiment above.

Figure 6:
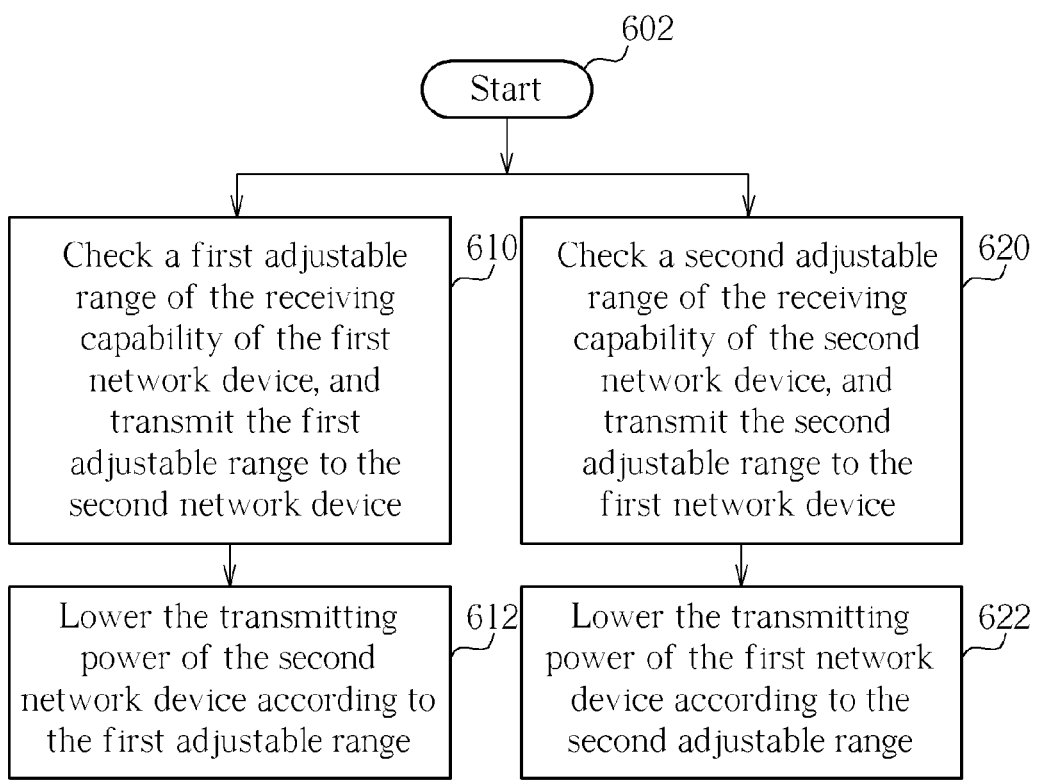
FIG. 6 is a flowchart illustrating a power consumption control method applied to a communication system according to another exemplary embodiment of the present invention.

Please refer to FIG. 6. FIG. 6 is a flowchart illustrating a power consumption control method applied to a communication system according to another exemplary embodiment of the present invention. The method includes, but is not limited to, the following steps:

Step 602: Start.

Step 610: Check a first adjustable range of the receiving capability of the first network device, and transmit the first adjustable range to the second network device. After that, go to Step 612.

Step 612: When the first adjustable range is received, lower the transmitting power of the second network device according to the first adjustable range.

Step 620: Check a second adjustable range of the receiving capability of the second network device, and transmit the second adjustable range to the first network device. After that, go to Step 622.

Step 622: When the second adjustable range is received, lower the transmitting power of the first network device according to the second adjustable range.

How each element operates can be known by collocating the steps shown in FIG. 6 and the elements shown in FIG. 2, and further description is omitted here for brevity.

Figure 7:
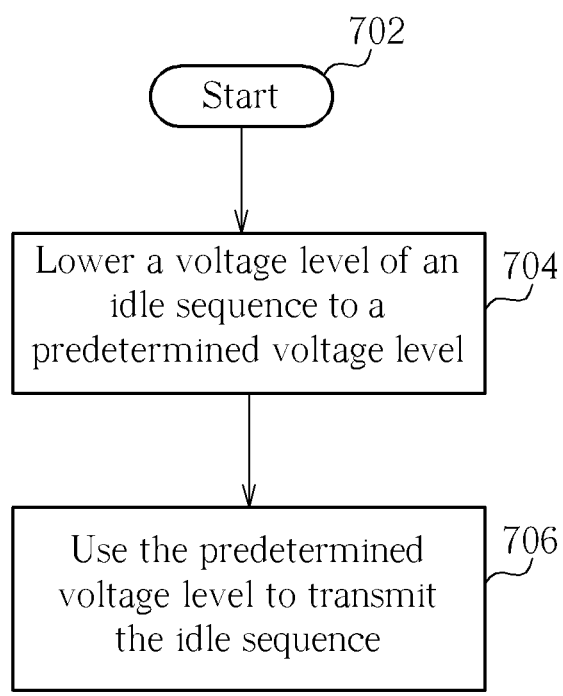
FIG. 7 is a flowchart illustrating a power consumption control method applied to a communication system according to another exemplary embodiment of the present invention.

Please refer to FIG. 7. FIG. 7 is a flowchart illustrating a power consumption control method applied to a communication system according to another exemplary embodiment of the present invention. The method includes, but is not limited to, the following steps:

Step 702: Start.

Step 704: Lower a voltage level of an idle sequence to a predetermined voltage level.

Step 706: Use the predetermined voltage level to transmit the idle sequence.

How each element operates can be known by collocating the steps shown in FIG. 7 and the elements shown in FIG. 3, and further description is omitted here for brevity.

Please note that, the steps of the abovementioned flowcharts are merely practicable embodiments of the present invention, and in no way should be considered to be limitations of the scope of the present invention. These methods can include other intermediate steps or several steps can be merged into a single step without departing from the spirit of the present invention.

The abovementioned embodiments are presented merely for describing the features of the present invention, and in no way should be considered to be limitations of the scope of the present invention. In summary, the present invention provides a power consumption control method applied to a communication system and related devices. By making use of communications between two network devices to adjust transmitting capabilities of the network devices, a goal of saving power can be achieved. Therefore, after lowering or raising the transmitting capabilities of the both sides for several times, optimum setting parameters can be found to achieve an optimum power-saving performance. In addition, more additional features can be designed into the first network device and the second network device so as to improve the applications of the communication system. As an illustration, the transmitting power of the network devices can be adjusted by making use of communications between the two network devices 2100 and 2200, e.g. the communication system 200 shown in FIG. 2 and the flowchart shown in FIG. 6. Or the lowered voltage level can be used for transmitting an idle sequence so as to save the power under the idle mode, e.g. the communication system 300 shown in FIG. 3 and the flowchart shown in FIG. 7. Moreover, a fallback mechanism can be designed to notify the other side to restore the abovementioned over-adjusted parameters in order to avoid errors. Therefore, the power consumption control mechanism of the communication system disclosed in the present invention is able to achieve an optimum power-saving performance and avoid errors by making use of communications between two network devices.

Those skilled in the art will readily observe that numerous modifications and alterations of the device and method may be made while retaining the teachings of the invention.

What is claimed is:

1. A power consumption control method applied to a communication system, the communication system comprising a first network device and a second network device, the power consumption control method comprising:

checking a receiving capability of the first network device to generate a first checking result;

selectively notifying the second network device to adjust a transmitting capability of the second network device according to the first checking result, wherein selectively notifying the second network device comprises:

in response to the receiving capability of the first network device being greater than a first threshold, transmitting a first notice signal to notify the second network device, wherein when the first notice signal is received, the transmitting capability of the second network device is lowered; and in response to the receiving capability of the first network device being less than the first threshold, maintaining a current transmitting capability of the second network device;

checking an adjustable range of the receiving capability of the first network device, and transmitting the adjustable range to the second network device; and receiving an adjustable range of the receiving capability of the second network device.

2. The power consumption control method of 1, further comprising:

after the transmitting capability of the second network device is lowered, checking a receiving capability of the second network device to generate a second checking result; and when the second checking result indicates that the receiving capability of the second network device is greater than a second threshold, transmitting a second notice signal to notify the first network device to be able to continue to lower the transmitting capability of the second network device.

3. The power consumption control method of claim 2, further comprising:

when the second checking result indicates that the receiving capability of the second network device is not greater than the second threshold, transmitting a third notice signal to notify the first network device not allowed to continue to lower the transmitting capability of the second network device; and raising the transmitting capability of the second network device.

4. The power consumption control method of claim 1, further comprising:

after the transmitting capability of the second network device is lowered, checking the receiving capability of the first network device to generate a third checking result;

when the third checking result indicates that the receiving capability of the first network device is not greater than the first threshold, transmitting a fourth notice signal to notify the second network device; and when the fourth notice signal is received, raising the transmitting capability of the second network device.

5. The power consumption control method of claim 1, being executed under a training mode of the communication system.

6. The power consumption control method of claim 1, further comprising:

when the adjustable range is received by the second network device, lowering a transmitting power of the second network device according to the adjustable range.

7. The power consumption control method of claim 1, further comprising:

lowering a voltage level of an idle sequence to a predetermined voltage level; and using the predetermined voltage level to transmit the idle sequence.

8. The power consumption control method of claim 1, wherein the step of selectively notifying the second network device to adjust the transmitting capability of the second network device according to the first checking result comprises:

when the first checking result indicates that the receiving capability of the first network device is not greater than a third threshold, transmitting a fifth notice signal to notify the second network device; and when the fifth notice signal is received, raising the transmitting capability of the second network device.

9. The power consumption control method of claim 8, being executed under a data mode of the communication system.

10. The power consumption control method of claim 1, wherein the step of checking the receiving capability of the first network device is performed by checking the receiving capability of the first network device according to a signal to noise ratio (SNR), a maximum error, or a Viterbi error of a network signal received by the first network device.

11. A communication system capable of controlling power consumption, comprising:

a first network device, comprising:
a first receiver;
a first transmitter;
a first checking module, for checking a receiving capability of the first receiver of the first network device to generate a first checking result; and
a first signal transmitting module, for selectively generating a notice signal according to the first checking result;
a first idle sequence voltage level adjusting module for lowering a voltage level of an idle sequence during idle mode to a predetermined voltage level such that a voltage range of the idle sequence is less than a voltage range for transmitting data under a normal mode; and a second network device, comprising:
a second receiver;
a second transmitter; and
a second transmitting capability adjusting module, for adjusting a transmitting capability of the second transmitter of the second network device according to the notice signal, wherein the first signal transmitting module is further configured for transmitting a first notice signal to notify the second network device when the first checking result indicates that the receiving capability of the first receiver of the first network device is greater than a first threshold, and wherein the second transmitting capability adjusting module is further configured for lowering the transmitting capability of the second transmitter of the second network device when the first notice signal is received.

12. The communication system of claim 11, wherein the second network device further comprises:

a second checking module, for checking a receiving capability of the second receiver to generate a second checking result after the transmitting capability of the second transmitter is lowered by the second transmitting capability adjusting module; and a second signal transmitting module, for transmitting a second notice signal to notify the first network device to be able to continue to lower the transmitting capability of the second network device when the second checking result indicates that the receiving capability of the second receiver of the second network device is greater than a second threshold.

13. The communication system of claim 12, wherein the second signal transmitting module is further used for:

transmitting a third notice signal to notify the first network device not allowed to continue to lower the transmitting capability of the second transmitter of the second network device when the second checking result indicates that the receiving capability of the second receiver of the second network device is not greater than the second threshold; and the second transmitting capability adjusting module is further used for:

raising the transmitting capability of the second transmitter of the second network device when the second checking result indicates that the receiving capability of the second receiver of the second network device is not greater than the second threshold.

14. The communication system of claim 11, wherein the first checking module is further used for:

checking the receiving capability of the first receiver of the first network device to generate a third checking result after the transmitting capability of the second transmitter of the second network device is lowered;

the first signal transmitting module is further used for:

transmitting a fourth notice signal to notify the second network device when the third checking result indicates that the receiving capability of the first receiver of the first network device is not greater than the first threshold; and the second transmitting capability adjusting module is further used for:

raising the transmitting capability of the second transmitter of the second network device when the fourth notice signal is received.

15. The communication system of claim 11, being executed under a training mode.

16. The communication system of claim 11, wherein the first checking module is further used for:

checking an adjustable range of the receiving capability of the first receiver of the first network device;

the first signal transmitting module is further used for:

transmitting the adjustable range to the second network device; and the second network device further comprises:

a second transmitting power adjusting module, for lowering a transmitting power of the second transmitter of the second network device according to the adjustable range when the adjustable range is received.

17. The communication system of claim 11, wherein the first network device further comprises a first idle sequence transmitting module, for using the predetermined voltage to transmit the idle sequence; and the second network device further comprises:

a second idle sequence voltage level adjusting module, for lowering the voltage level of the idle sequence to the predetermined voltage level; and a second idle sequence transmitting module, for using the predetermined voltage level to transmit the idle sequence.

18. The communication system of claim 11, wherein the first signal transmitting module is further used for:

transmitting a fifth notice signal to notify the second network device when the first checking result indicates that the receiving capability of the first receiver is not greater than a third threshold; and the second transmitting capability adjusting module is further used for:

raising the transmitting capability of the second transmitter when the fifth notice signal is received.

* * * * *